(12) United States Patent
Tanaka et al.

(10) Patent No.: US 10,542,199 B2
(45) Date of Patent: *Jan. 21, 2020

(54) IMAGE CAPTURE APPARATUS COMPRISING IMAGE TRANSMISSION FUNCTION

(71) Applicant: CASIO COMPUTER CO., LTD., Shibuya-ku, Tokyo (JP)

(72) Inventors: Hitoshi Tanaka, Tokyo (JP); Taku Koreki, Tokyo (JP); Takashi Onoda, Tokyo (JP); Ai Nakajima, Tokyo (JP); Genki Kumazaki, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/043,103

(22) Filed: Jul. 23, 2018

(65) Prior Publication Data

US 2018/0332212 A1 Nov. 15, 2018

Related U.S. Application Data

(62) Division of application No. 15/340,523, filed on Nov. 1, 2016, now Pat. No. 10,057,476.

(30) Foreign Application Priority Data

Nov. 13, 2015 (JP) .................................. 2015-223039

(51) Int. Cl.
*H04N 5/232* (2006.01)
*H04N 5/225* (2006.01)

(52) U.S. Cl.
CPC ....... *H04N 5/23203* (2013.01); *H04N 5/2253* (2013.01); *H04N 5/23241* (2013.01); *H04N 5/23245* (2013.01)

(58) Field of Classification Search
CPC ........... H04N 5/23203; H04N 5/23245; H04N 5/2253; H04N 5/23241
See application file for complete search history.

(56) References Cited

U.S. PATENT DOCUMENTS

| 7,164,438 B2 | 1/2007 | Kindaichi |
| 7,605,849 B1 | 10/2009 | Hatanaka |

(Continued)

FOREIGN PATENT DOCUMENTS

| JP | 2002084448 A | 3/2002 |
| JP | 2003023593 A | 1/2003 |

(Continued)

OTHER PUBLICATIONS

Japanese Office Action (and English translation thereof) dated Sep. 19, 2017, issued in counterpart Japanese Application No. 2015-223039.

(Continued)

*Primary Examiner* — Jason A Flohre
(74) *Attorney, Agent, or Firm* — Holtz, Holtz & Volek PC

(57) ABSTRACT

An image capture apparatus includes an image capture unit, a communication unit, and a control unit which communicates with an external device by first or second communication systems. The first system maintains communication connection even if the apparatus and device are not in a predetermined operational mode for executing image transmission processing. The second system maintains communication connection if the apparatus and device are in the predetermined mode. The control unit can automatically transmit a photographed image to an external device through the communication unit by the second communication system, and switch and control first and second functional modes for enabling and disabling a photography function, respectively. Where an image is photographed in the first mode, the control unit records the image as a target for (Continued)

automatic transmission. If the transmission target image is recorded, automatic transmission is not started during the first mode, and started during the second mode.

8 Claims, 5 Drawing Sheets

(56) References Cited

U.S. PATENT DOCUMENTS

| | | | |
|---|---|---|---|
| 8,624,984 B2 | 1/2014 | Azuma et al. | |
| 8,797,412 B2 | 8/2014 | Tokunaga | |
| 9,363,757 B2 | 6/2016 | Takahashi et al. | |
| 9,438,784 B2 | 9/2016 | Endo | |
| 2002/0191079 A1* | 12/2002 | Kobayashi | H04N 5/772 348/207.1 |
| 2004/0239765 A1* | 12/2004 | Kuromatsu | H04N 1/00212 348/207.1 |
| 2006/0184705 A1 | 8/2006 | Nakajima | |
| 2007/0109420 A1 | 5/2007 | Takeshi | |
| 2008/0074501 A1 | 3/2008 | Matsushima | |
| 2014/0094198 A1 | 4/2014 | Heo et al. | |
| 2014/0347503 A1 | 11/2014 | Endo | |
| 2015/0103708 A1 | 4/2015 | Kang et al. | |
| 2015/0189176 A1* | 7/2015 | Pacurariu | H04N 5/23241 348/143 |
| 2015/0245298 A1* | 8/2015 | Takahashi | H04W 52/0254 455/574 |
| 2016/0066248 A1* | 3/2016 | Sato | H04W 76/10 370/315 |
| 2016/0360484 A1* | 12/2016 | Moritomo | H04W 52/0219 |

FOREIGN PATENT DOCUMENTS

| | | |
|---|---|---|
| JP | 2004297606 A | 10/2004 |
| JP | 2014230024 A | 12/2014 |
| JP | 2015180043 A | 10/2015 |

OTHER PUBLICATIONS

Japanese Office Action dated Oct. 29, 2019 (and English translation thereof) issued in Japanese Patent Application No. 2018-046157.

* cited by examiner

IMAGE CAPTURE APPARATUS COMPRISING IMAGE TRANSMISSION FUNCTION

CROSS-REFERENCE TO RELATED APPLICATIONS

This is a Divisional of U.S. application Ser. No. 15/340,523, filed Nov. 1, 2016, which is based upon and claims the benefit of priority from prior Japanese Patent Application No. 2015-223039, filed Nov. 13, 2015, the entire contents of both of which are incorporated herein by reference.

BACKGROUND OF THE INVENTION

Field of the Invention

The present invention relates to an image capture apparatus provided with a communication function.

Related Art

Conventionally, a camera provided with an automatic transmission function for automatically transmitting photographed images to an external device has been known (refer to Patent Document 1).

Patent Document 1: Japanese Unexamined Patent Application, Publication No. 2014-230024

SUMMARY OF THE INVENTION

According to one aspect of the present invention,
an image capture apparatus is provided with a communication function, and includes:
an image capture unit including an image sensor;
a communication unit including a communication circuit; and
a control unit including a processor;
in which the control unit is configured to:
perform automatic transmission for automatically transmitting an image photographed with the image capture unit to an external device through the communication unit;
switch and control a first functional mode for enabling a photography function, and a second functional mode for disabling the photography function and enabling a communication function in relation to image transmission;
in a case in which an image is photographed in the first functional mode, record the photographed image as a transmission target image that is targeted for the automatic transmission; and
even if the transmission target image is recorded, control the communication unit not to start automatic transmission of the transmission target image to the external device during the first functional mode, and control the communication unit to start automatic transmission of the transmission target image to the external device during the second functional mode.

Further, according to another aspect of the present invention,
a communication control method is executed by way of an image capture apparatus, and the method includes the steps of:
performing automatic transmission for automatically transmitting a photographed image to an external device through a communication unit;
switching and controlling a first functional mode for enabling a photography function, and a second functional mode for disabling the photography function and enabling a communication function in relation to image transmission;
in a case in which an image is photographed in the first functional mode, recording the photographed image as a transmission target image that is targeted for the automatic transmission; and
even if the transmission target image is recorded, controlling the communication unit not to start automatic transmission of the transmission target image to the external device during the first functional mode, and controlling the communication unit to start automatic transmission of the transmission target image to the external device during the second functional mode.

In addition, according to still another aspect of the present invention,
a non-transitory recording medium having a program recorded thereon for causing a computer for controlling an image capture apparatus to execute the processing of:
performing automatic transmission for automatically transmitting a photographed image to an external device through a communication unit;
switching and controlling a first functional mode for enabling a photography function, and a second functional mode for disabling the photography function and enabling a communication function in relation to image transmission;
in a case in which an image is photographed in the first functional mode, recording the photographed image as a transmission target image that is targeted for the automatic transmission; and
even if the transmission target image is recorded, controlling the communication unit not to start automatic transmission of the transmission target image to the external device during the first functional mode, and controlling the communication unit to start automatic transmission of the transmission target image to the external device during the second functional mode.

DETAILED DESCRIPTION OF THE INVENTION

An embodiment of the present invention is described hereinafter with reference to the drawings.

Figure 1:
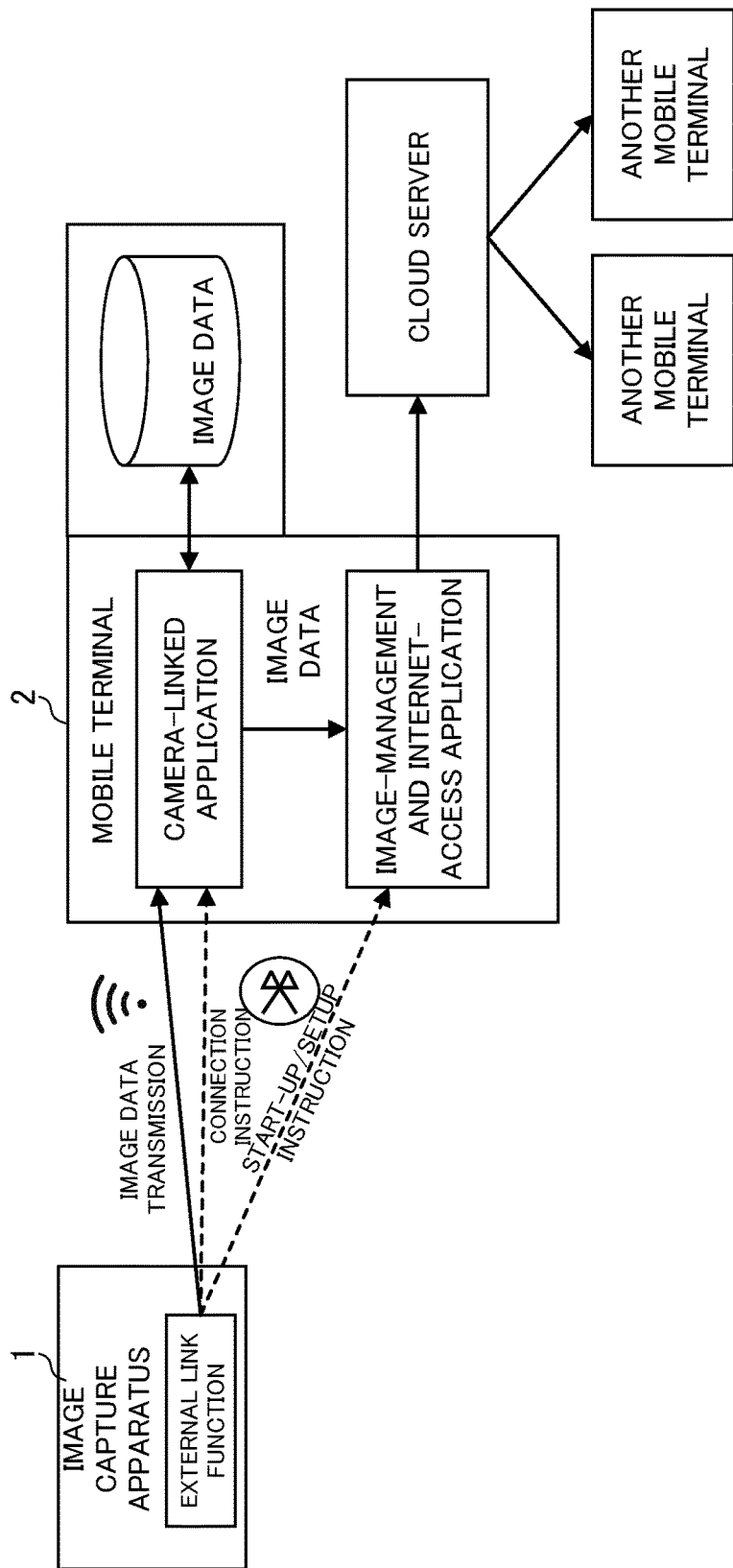
FIG. 1 is a system configuration diagram illustrating a system configuration of a communication system according to an embodiment of the present invention.

FIG. 1 is a system configuration diagram illustrating a system configuration of a communication system according to an embodiment of the present invention.

As illustrated in FIG. 1, a communication system S is provided with an image capture apparatus 1 and a mobile terminal 2.

The image capture apparatus 1 has a photography function and a communication function, and can transmit a photographed image to the mobile terminal 2 after photographing the image.

The mobile terminal 2 has a communication function, and can acquire an image from the image capture apparatus 1, store the image acquired, and share the image with another mobile terminal via a cloud server.

In the present embodiment, the image capture apparatus 1 and the mobile terminal 2 are configured to perform communication via two communication schemes: a first communication scheme capable of being always connected while saving electric power (Bluetooth Low Energy (BLE) (trademark) in the present embodiment); and a second communication scheme capable of exchanging large-capacity data (Wi-Fi in the present embodiment).

Specifically, a user operates the image capture apparatus 1 as one device, and the image capture apparatus 1 enables an external link function, and transmits an instruction (connection instruction) for establishing communication connection via the second communication scheme, which is adapted for transmitting and receiving image files, to the mobile terminal 2 through communication via the first communication scheme.

The mobile terminal 2 receives the connection instruction through communication via the first communication scheme, enables a camera-linked application function, and executes processing for establishing communication via the second communication scheme, thereby establishing communication connection between the image capture apparatus 1 and the mobile terminal 2 via the second communication scheme.

More specifically, based on the connection instruction from the image capture apparatus 1 through communication via the first communication scheme, a program for enabling the camera-linked application function of the mobile terminal 2 is started up, and communication via the second communication scheme is established between the image capture apparatus 1 and the mobile terminal 2, by virtue of the external link function of the image capture apparatus 1 as well as the camera-linked application function of the mobile terminal 2.

The first communication scheme saves electric power, and is always connected even in the case where the main power supply of the image capture apparatus 1 and/or the mobile terminal 2 is turned off (or in a low power consumption mode); and the first communication scheme has a function to turn on the main power supply (or cancel the low power consumption mode), and a function to start up (execute) a designated application program via the first communication scheme, such that one device with the main power supply off (or in the low power consumption mode) can communicate and execute an application program at least via the second communication scheme, by virtue of communication from another device via the first communication.

Therefore, for example, in the event such as transmitting an image photographed with the image capture apparatus 1, communication via the second communication scheme for such data communication can be established without operating the mobile terminal 2.

As a result, data communication can be performed between the image capture apparatus 1 and the mobile terminal 2, and image data can be automatically transmitted from the image capture apparatus 1 to the mobile terminal 2.

Note that the received image data is temporarily stored into the storage of the mobile terminal 2 by enabling the camera-linked application function.

Further, in the present embodiment, in the case of utilizing image data that is automatically transmitted and received by virtue of the external link function of the image capture apparatus 1 as well as the camera-linked application function of the mobile terminal 2, data of images photographed with the image capture apparatus 1 is automatically made viewable from a mobile terminal or the like of another user, by use of the sharing services on the Internet. Specifically, when an image is photographed with the image capture apparatus 1 being set to a linked-operation mode for automatically sharing images, the image capture apparatus 1 instructs the mobile terminal 2 to allow the image capture apparatus 1 to share the image with another mobile terminal, through communication via the first communication. Upon receiving the instruction to share, the mobile terminal 2 enables the camera-linked application function; receives data of the image photographed with the image capture apparatus 1; temporarily stores the data of the image into the storage of the mobile terminal 2; subsequently enables a function of an image-management and internet-access application by virtue of an instruction from the camera-linked application function (starts up a program for this function); manages the image data, which is temporarily stored in the storage of the mobile terminal 2, by way of its own function (of the image-management and internet-access application); and transmits the image data to a pre-linked cloud server for the purpose of sharing the image. The cloud server allows another pre-linked mobile terminal to utilize the image data, thereby sharing the image that is photographed with the image capture apparatus 1 and received by way of the mobile terminal 2.

Note that, in the present embodiment, the image capture apparatus 1 and the mobile terminal 2 are each configured as an apparatus for realizing a predetermined function in collaboration with another device. The image capture apparatus 1 and the mobile terminal 2 exchange data (transfer data) with each other, through Wi-Fi that is the second communication scheme, thereby executing linked processing (hereinafter referred to as "linked processing") such as, for example, processing for transferring an image to the mobile terminal 2 and causing the mobile terminal 2 to obtain the image, in response to an operation on the image capture apparatus 1, and processing for causing the image capture apparatus 1 to transfer an image to the mobile terminal 2, in response to an operation on the mobile terminal 2.

In addition, in order to transition from the state of not allowing the linked processing to be executed due to communication connection via Wi-Fi being the second communication scheme not being established, to the state of allowing the linked processing to be executed, the image capture apparatus 1 and the mobile terminal 2 are configured to establish communication connection by operating one apparatus so as to turn on the Wi-Fi being the second communication scheme of another apparatus, via BLE being the first communication scheme that maintains connection (always-on connection). Namely, BLE being the first communication scheme maintains communication connection (always-on connection) with another apparatus, even in the state of not allowing predetermined linked processing to be executed, or in the state of not being ready to execute the predetermined linked processing, due to any reason such as communication connection with another apparatus not being established. Here, "the state of not being ready to execute the predetermined linked processing" refers to a state where the power supply of another apparatus is turned off, a state where the program for executing the predetermined linked processing is not started up, or a state where communication connection via Wi-Fi being the second communication scheme is not established (herein, the state where the power supply is turned off includes a low power consumption mode, in which communication via the first communication scheme is allowed, but communication via the second communication scheme is not allowed, and the predetermined linked processing cannot be executed.) Therefore, even in the state of not being ready to execute the predetermined linked processing, i.e. the state where the power supply of another apparatus is turned off, or the state where the program for executing the predetermined linked processing is not started up, or the state where communication connection via Wi-Fi being the second communication scheme is not established (or the state of not functioning), the image capture apparatus 1 and the mobile terminal 2 transition to the state of being ready to execute the predetermined linked processing, via BLE being the first communication scheme.

Figure 2:
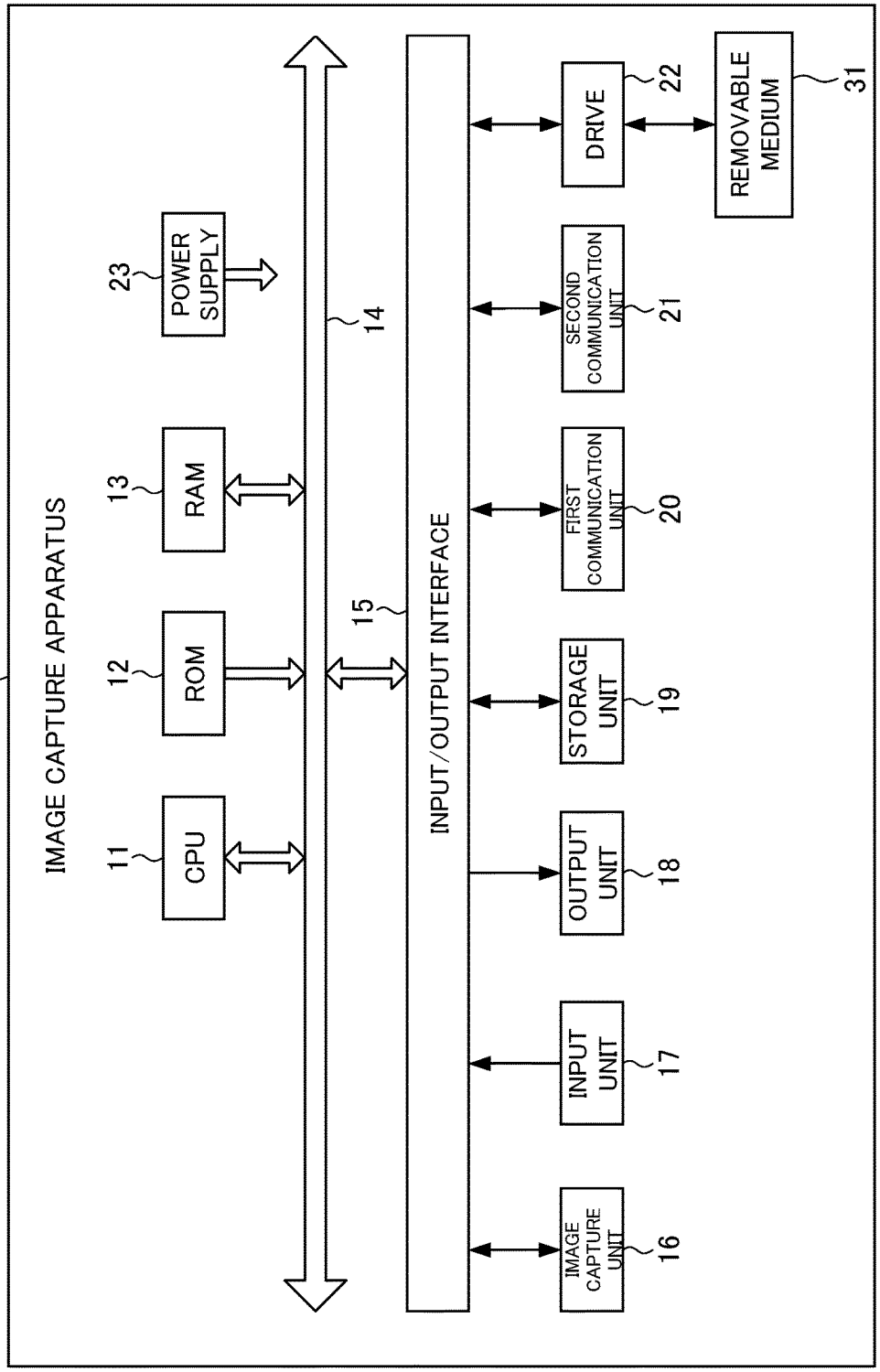
FIG. 2 is a block diagram illustrating a hardware configuration of an image capture apparatus according to an embodiment of the present invention.

FIG. 2 is a block diagram illustrating a hardware configuration of the image capture apparatus 1 and the mobile terminal 2 according to an embodiment of the present invention.

The image capture apparatus 1 is configured as, for example, a digital still camera.

The image capture apparatus 1 is provided with a CPU (Central Processing Unit) 11, ROM (Read Only Memory) 12, RAM (Random Access Memory) 13, a bus 14, an input/output interface 15, an image capture unit 16, an input unit 17, an output unit 18, a storage unit 19, a first communication unit 20, a second communication unit 21, a drive 22, and a power supply unit 23.

The CPU 11 executes various processing according to programs that are recorded in the ROM 12, or programs that are loaded from the storage unit 19 to the RAM 13.

The RAM 13 also stores data and the like necessary for the CPU 11 to execute the various processing, as appropriate.

The CPU 11 including the ROM 12 and the RAM 13 composes a control unit.

The CPU 11, the ROM 12 and the RAM 13 are connected to one another via the bus 14. The input/output interface 15 is also connected to the bus 14. The image capture unit 16, the input unit 17, the output unit 18, the storage unit 19, the first communication unit 20, the second communication unit 21, the drive 22, and the power supply unit 23 are connected to the input/output interface 15.

The image capture unit 16 includes an optical lens unit and an image sensor, which are not shown.

In order to photograph a subject, the optical lens unit is configured by a lens such as a focus lens and a zoom lens for condensing light.

The focus lens is a lens for forming an image of a subject on the light receiving surface of the image sensor. The zoom lens is a lens that causes the focal length to freely change in a certain range.

The optical lens unit also includes peripheral circuits to adjust setting parameters such as focus, exposure, white balance, and the like, as necessary.

The image sensor is configured by an optoelectronic conversion device, an AFE (Analog Front End), and the like.

The optoelectronic conversion device is configured by a CMOS (Complementary Metal Oxide Semiconductor) type of optoelectronic conversion device and the like, for example. Light incident through the optical lens unit forms an image of a subject in the optoelectronic conversion device. The optoelectronic conversion device optoelectronically converts (i.e. captures) the image of the subject, accumulates the resultant image signal for a predetermined time interval, and sequentially supplies the image signal as an analog signal to the AFE.

The AFE executes a variety of signal processing such as A/D (Analog/Digital) conversion processing of the analog signal. The variety of signal processing generates a digital signal that is output as an output signal from the image capture unit 16. Such an output signal of the image capture unit 16 is hereinafter referred to as "data of a photographed image". Data of a photographed image is supplied to the CPU 11, an image processing unit (not illustrated), and the like as appropriate.

The input unit 17 is configured by various buttons and the like, and inputs a variety of information in accordance with instruction operations by the user.

The output unit 18 is configured by the display unit, a speaker, and the like, and outputs images and sound.

The storage unit 19 is configured by DRAM (Dynamic Random Access Memory) or the like, and stores data of various images.

The first communication unit 20 and the second communication unit 21 are configured to include a communication antenna and a communication circuit that is an electronic circuit for controlling communication.

The first communication unit 20 controls communication with a terminal device (mobile terminal 2 in the present embodiment) as an external device, via the first communication scheme that is low-speed, energy-saving, and adapted for always-on connection. In the present embodiment, the first communication scheme uses a communication scheme based on a BLE communication standard.

The second communication unit 21 controls communication with an external device (mobile terminal 2 in the present embodiment) via the second communication scheme that is high-speed and adapted for transmitting and receiving files. In the present embodiment, the second communication scheme uses a communication scheme based on a Wi-Fi communication standard for wireless LAN.

A removable medium 31 composed of a magnetic disk, an optical disk, a magneto-optical disk, semiconductor memory or the like is installed in the drive 22, as appropriate. Programs that are read via the drive 22 from the removable medium 31 are installed in the storage unit 19, as necessary. Similar to the storage unit 19, the removable medium 31 can also store a variety of data such as the image data stored in the storage unit 19.

The power supply unit 23 is a power supply source that is configured by a lithium ion secondary battery and supplies electric power for driving to the image capture apparatus 1 via a power supply circuit (not illustrated), and supplies electric current as a driving source of the image capture apparatus 1 to each configuration of the image capture apparatus 1. The power supply unit 23 is controlled by the CPU 11, for example, so as to stop supplying electric power to the output unit 18, etc. to turn off display output, while maintaining supply of the electric power for the communication of the first communication unit 20 and the second communication unit 21, such that images can be transmitted even in the state where the power supply is turned off.

With the image capture apparatus 1 as thus constituted, when an image is photographed, the image is transmitted to the mobile terminal 2; however, the image capture apparatus 1 is configured to avoid transmitting the image while other functions are enabled, in order to avoid operational interference with the other functions.

The image capture apparatus 1 has a function of transmitting an image by enabling only the communication function, in the sleep mode for disabling various functions. As a result, an image transmission operation and other operations will not be performed at the same time in the image capture apparatus 1, and an image can be reliably transmitted without interfering with any other event.

After transmitting an image, the image capture apparatus 1 will transition to the sleep mode for suspending all of the functions including the communication function, thereby suppressing the power consumption (a state where electricity is supplied to only some circuits necessary for resuming from the sleep mode, and electricity to the other circuits is suspended).

Such a sleep (mode) is hereinafter referred to as a first sleep (mode); and in relation to the first sleep mode, a mode for enabling only the communication function, and disabling the other functions, for the purpose of transmitting an image from the image capture apparatus 1 to the mobile terminal 2 (or maintaining the state of pairing between the image capture apparatus 1 and the mobile terminal 2), is hereinafter referred to as a second sleep (mode). The first sleep mode is a mode for further disabling the communication function of the second sleep mode.

Such a sleep (mode) for suspending not only some functions but also cutting power supply to all circuits other than the minimal circuits may also be referred to as a deep sleep (mode), as distinguished from the normal sleep (mode). Moreover, a normal operation mode other than the sleep mode may also be referred to as a non-sleep mode.

Figure 3:
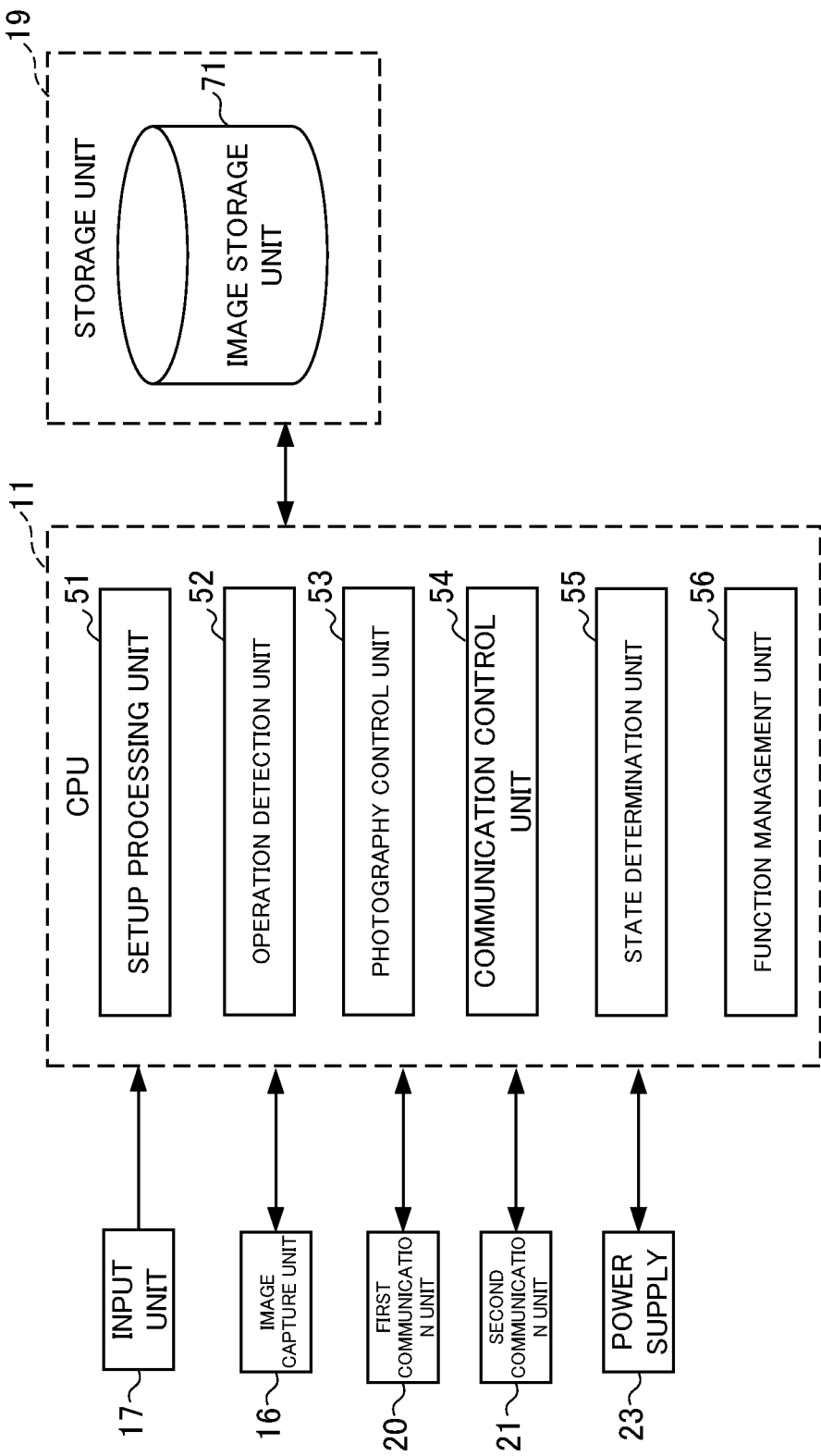
FIG. 3 is a functional block diagram illustrating a functional configuration for executing image transmission processing, in relation to the functional configurations of the image capture apparatus of FIG. 2.

FIG. 3 is a functional block diagram illustrating a functional configuration for executing image transmission processing, in relation to the functional configurations of the image capture apparatus 1 of FIG. 2.

The image transmission processing refers to a sequence of processing for automatically transmitting photographed images to a terminal device during the sleep mode.

As illustrated in FIG. 3, in the case of executing the image transmission processing, a setup processing unit 51, an operation detection unit 52, a photography control unit 53, a communication control unit 54, a state determination unit 55, and a function management unit 56 function in the CPU 11.

Further, an image storage unit 71 is provided to an area of the storage unit 19.

The image storage unit 71 stores data of images photographed with the image capture unit 16.

The setup processing unit 51 sets various modes and functions. Specifically, the setup processing unit 51 sets an automatic transmission mode for transmitting an image to a terminal device (mobile terminal 2 in the present embodiment) without any transmission operation by a user, and enables/disables the automatic sleep function for automatically transitioning to the sleep mode, based on the elapse of a predetermined period of time, etc.

The operation detection unit 52 detects various operations on the input unit 17.

Specifically, the operation detection unit 52 detects operations on the input unit 17, such as an operation to photograph or an operation to cancel the sleep mode.

The photography control unit 53 controls the image capture unit 16 to photograph. Images photographed with the image capture unit 16 are stored into the image storage unit 71.

The communication control unit 54 manages the communication status, controls the first communication unit 20 to communicate via BLE, and controls the second communication unit to communicate via Wi-Fi.

The state determination unit 55 determines whether no user operations are anticipated for more than a predetermined period of time.

The state of anticipating no user operations for more than a predetermined period of time refers to, for example, a state of having no user operations for more than a predetermined period of time, a state after transitioning to the sleep mode (low power consumption mode) by way of a user operation, etc.

The function management unit 56 controls the power supply unit 23 to manage the power supply, and enables/disables various functions.

Specifically, the function management unit 56 controls a normal mode (non-sleep mode) for allowing user operations, and a sleep mode for suppressing the electrical power consumption, and allowing quick startup by way of a user operation.

In the present embodiment, the sleep mode includes the first sleep mode that is a mode for power-saving and waiting for startup, and the second sleep mode that is a mode for power-saving and waiting for startup while allowing images to be automatically transmitted.

In the first sleep mode, the power supply is not completely turned off; however, the electricity other than electricity necessary for quick startup is suspended, so as to be able to quickly resume the operational mode by way of a user operation, etc.

In the second sleep mode, only the communication function is enabled in relation to the first sleep mode, thereby allowing images to be automatically transmitted in the sleep mode without any user operation.

As a result, images can be automatically transmitted without interfering with any other processing, in the sleep mode while user operations are not performed.

In addition, the function management unit 56 manages the functions by enabling or disabling some functions such as the photography function or the communication function.

Figure 4:
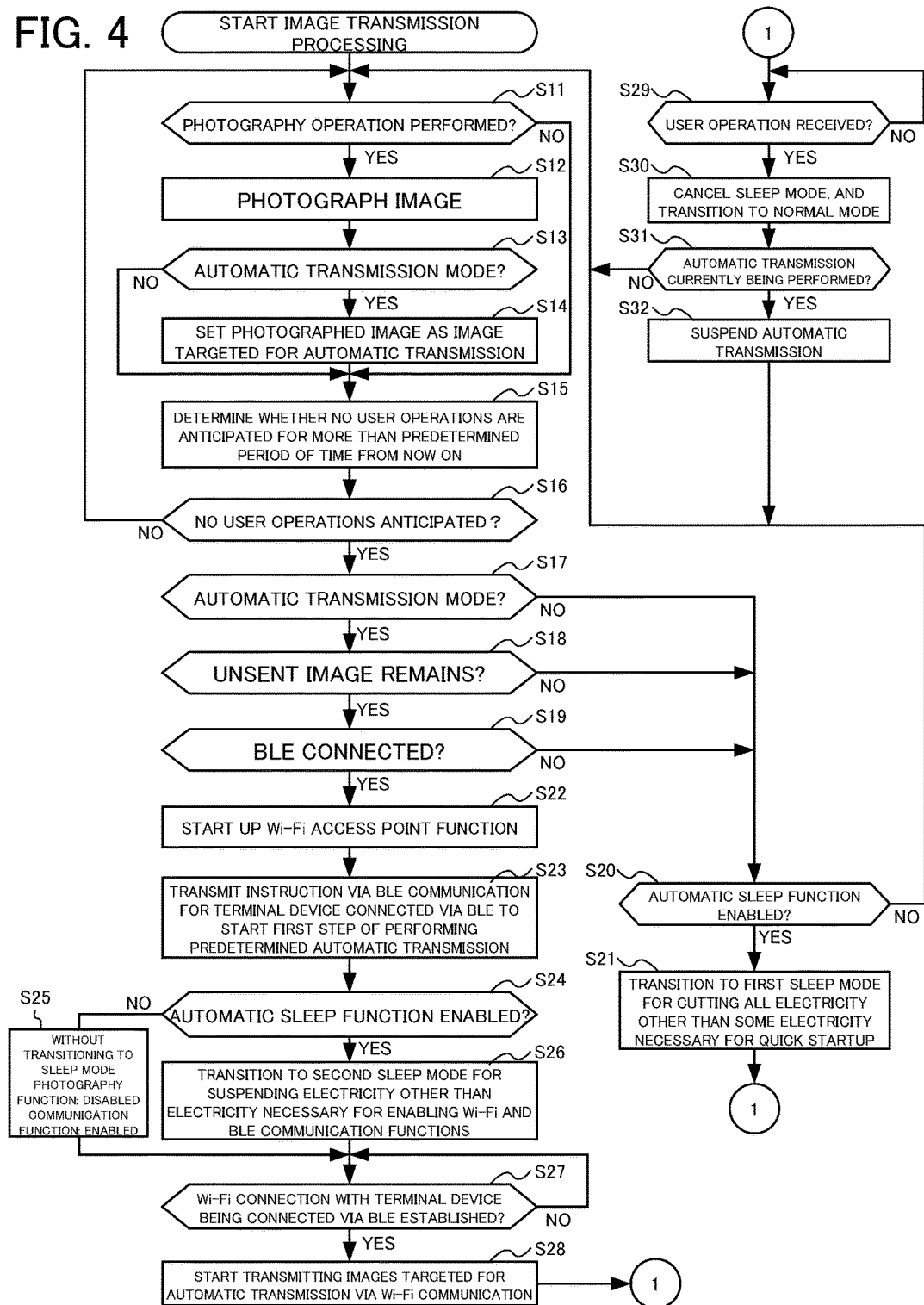
FIG. 4 is a flow diagram illustrating a flow of the image transmission processing executed by way of the image capture apparatus of FIG. 2 having the functional configuration of FIG. 3.

FIG. 4 is a flow diagram illustrating a flow of the image transmission processing executed by way of the image capture apparatus 1 of FIG. 2 having the functional configuration of FIG. 3. Note that, prior to the image transmission processing, the setup processing unit 51 preliminarily sets up or cancels (enables/disables) the automatic transmission mode and/or the automatic sleep function.

The image transmission processing is started by way of a user operation on the input unit 17 to start the image transmission processing.

In Step S11, the operation detection unit 52 determines whether a photography operation on the input unit 17 is performed.

In a case in which a photography operation is not performed, the determination in Step S11 is NO, and the processing advances to Step S15.

On the other hand, in a case in which a photography operation is performed, the determination in Step S11 is YES, and the processing advances to Step S12.

In Step S12, the photography control unit 53 controls the image capture unit 16 to photograph. Images photographed with the image capture unit 16 are stored into the image storage unit 71.

In Step S13, the setup processing unit 51 determines whether the current mode is an automatic transmission mode.

In a case in which the current mode is not an automatic transmission mode, the determination in Step S13 is NO, and the processing advances to Step S15.

On the other hand, in a case in which the current mode is an automatic transmission mode, the determination in Step S13 is YES, and the processing advances to Step S14.

In Step S14, the communication control unit 54 sets a photographed image as an image targeted for automatic transmission.

In Step S15, the state determination unit 55 determines whether no user operations are anticipated for more than a predetermined period of time from now on.

In Step S16, the state determination unit 55 determines whether no user operations are anticipated.

In a case in which no user operations are anticipated, the determination in Step S16 is YES, and the processing advances to Step S17.

On the other hand, in a case in which user operations are anticipated, the determination in Step S16 is NO, and the processing advances to Step S11.

In Step S17, the setup processing unit 51 determines whether the current mode is an automatic transmission mode.

In a case in which the current mode is an automatic transmission mode, the determination in Step S17 is YES, and the processing advances to Step S18.

On the other hand, in a case in which the current mode is not an automatic transmission mode, the determination in Step S17 is NO, and the processing advances to Step S20.

In Step S18, the communication control unit 54 determines whether an unsent image remains.

In a case in which an unsent image remains, the determination in Step S18 is YES, and the processing advances to Step S19.

On the other hand, in a case in which an unsent image does not remain, the determination in Step S18 is NO, and the processing advances to Step S20.

In Step S19, the communication control unit 54 determines whether BLE is connected.

In a case in which BLE is connected, the determination in Step S19 is YES, and the processing advances to Step S22.

On the other hand, in a case in which BLE is not connected, the determination in Step S19 is NO, and the processing advances to Step S20.

In Step S20, the setup processing unit 51 determines whether the automatic sleep function is enabled.

In a case in which the automatic sleep function is enabled, the determination in Step S20 is YES, and the processing advances to Step S21.

On the other hand, in a case in which the automatic sleep function is not enabled, the determination in Step S20 is NO, and the processing returns to Step S11.

In Step S21, the function management unit 56 performs transition to the first sleep mode for cutting all electricity other than some electricity necessary for quick startup (here, in a case in which a startup is desired to be based on a request from mobile terminal 2 instead of a user operation, the function management unit 56 may perform transition to the second sleep mode instead of the first sleep mode).

In Step S22, the communication control unit 54 controls the second communication unit to start up a Wi-Fi access point function.

In Step S23, the communication control unit 54 controls the first communication unit 20 to transmit an instruction, via BLE communication, for a terminal device connected via BLE to start a first step of performing predetermined automatic transmission. In the first step, the mobile terminal 2 proceeds with the processing on the premise that the image capture apparatus 1 can communicate via Wi-Fi.

In Step S24, the setup processing unit 51 determines whether the automatic sleep function is enabled.

In a case in which the automatic sleep function is enabled, the determination in Step S24 is YES, and the processing advances to Step S26.

On the other hand, in a case in which the automatic sleep function is not enabled, the determination in Step S24 is NO, and the processing advances to Step S25.

In Step S25, instead of transitioning to the sleep mode, the function management unit 56 disables the photography function, and enables the communication function.

In Step S26, the function management unit 56 performs transition to the second sleep mode for suspending electricity other than the electricity necessary for enabling the Wi-Fi and BLE communication functions.

In Step S27, the communication control unit 54 determines whether Wi-Fi connection with the terminal device being connected via BLE is established.

In a case in which Wi-Fi connection is established, the determination in Step S27 is YES, and the processing advances to Step S28.

On the other hand, in a case in which Wi-Fi connection is not established, the determination in Step S27 is NO, and the processing enters a standby state in Step S27.

In Step S28, the communication control unit 54 controls the second communication unit 21 to start transmitting the images targeted for automatic transmission via Wi-Fi communication.

In Step S29, the operation detection unit 52 determines whether a user operation is received.

In a case in which a user operation is received, the determination in Step S29 is YES, and the processing advances to Step S30.

On the other hand, in a case in which a user operation is not received, the determination in Step S29 is NO, and the processing enters a standby state in Step S29.

In Step S30, the function management unit 56 cancels the sleep mode, and performs transition to the normal mode.

In Step S31, the communication control unit 54 determines whether automatic transmission is currently being performed.

In a case in which automatic transmission is currently being performed, the determination in Step S31 is YES, and the processing advances to Step S32.

On the other hand, in a case in which automatic transmission is not currently being performed, the determination in Step S31 is NO, and the processing returns to Step S11.

In Step S32, the communication control unit 54 controls the second communication unit 21 to suspend the automatic transmission.

Namely, in the image transmission processing of the present embodiment, the image capture apparatus 1 operates as follows.

Pair a camera (image capture apparatus 1) with a smartphone (mobile terminal 2) via Bluetooth Smart (BLE), in accordance with procedures;

Store the access point information of the camera (image capture apparatus 1) into the smartphone (mobile terminal 2), such that the smartphone (mobile terminal 2) can automatically connect to the camera (image capture apparatus 1) via Wi-Fi;

Photograph images with the camera (image capture apparatus 1);

Allow the camera (image capture apparatus 1) to automatically or manually transition to the sleep mode, then the camera (image capture apparatus 1) will start up the access point, and transmit an instruction via Bluetooth Smart for the smartphone (mobile terminal 2) to connect to the access point of the camera (image capture apparatus 1);

Upon confirming Wi-Fi connection with the smartphone (mobile terminal 2), the camera (image capture apparatus 1) will transfer the photographed images to the smartphone (mobile terminal 2). The image size at this time conforms to the setting of "transmission resize" of the camera (image capture apparatus 1); and Upon receiving the images from the camera (image capture apparatus 1), an application of the smartphone (mobile terminal 2) will store the images into a designated area of the smartphone (mobile terminal 2).

Therefore, the image capture apparatus 1 can reliably transmit images without adversely affecting any other operation.

MODIFICATION EXAMPLE

The aforementioned embodiment is configured such that the mobile terminal 2 executes the processing on the premise that the image capture apparatus 1 can communicate via Wi-Fi; whereas, the present example is configured such that the mobile terminal 2 executes the processing on the premise that the image capture apparatus 1 is not started up, and the image capture apparatus 1 is started up before establishing Wi-Fi connection.

Figure 5:
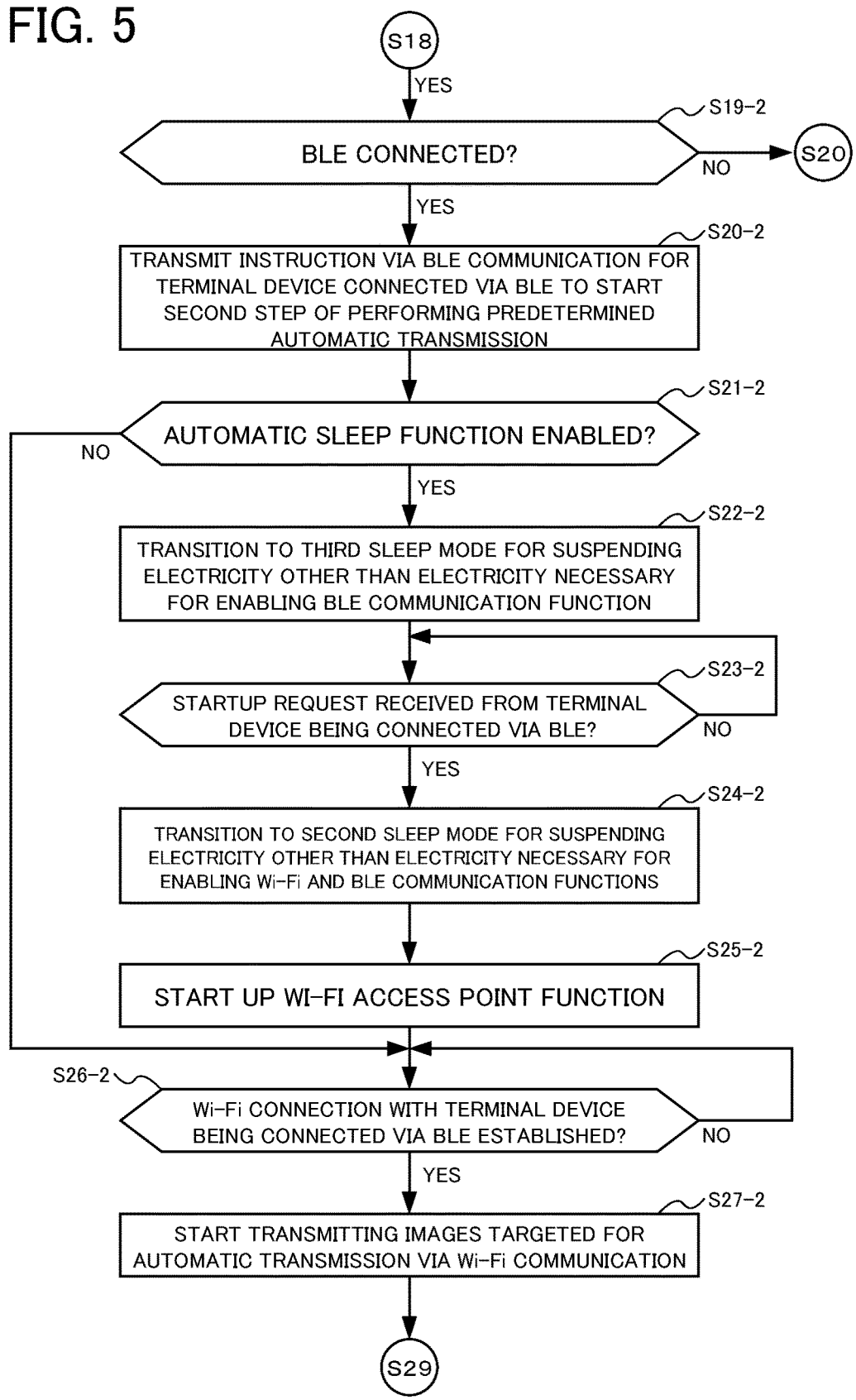
FIG. 5 is a flow diagram illustrating another flow of the image transmission processing that is executed by the image capture apparatus of FIG. 2 having the functional configuration of FIG. 3.

FIG. 5 is a flow diagram illustrating another flow of the image transmission processing that is executed by the image capture apparatus 1 of FIG. 2 having the functional configuration of FIG. 3. Note that the steps until Step S18 are the same as those in FIG. 4. Moreover, a flow different from the flow of FIG. 4 is hereinafter described, with the step numbers suffixed with "-2".

In Step S19-2, the communication control unit 54 determines whether BLE is connected.

In a case in which BLE is connected, the determination in Step S19-2 is YES, and the processing advances to Step S20-2.

On the other hand, in a case in which BLE is not connected, the determination in Step S19-2 is NO, and the processing advances to Step S20 of FIG. 4.

In Step S20-2, the communication control unit 54 controls the first communication unit 20 to transmit an instruction, via BLE communication, for a terminal device connected via BLE to start a second step of performing predetermined automatic transmission. In the second step, the mobile terminal 2 proceeds with the processing on the premise that the image capture apparatus 1 is not started up, and the image capture apparatus 1 needs to be started up before establishing Wi-Fi connection.

In Step S21-2, the setup processing unit 51 determines whether the automatic sleep function is enabled.

In a case in which the automatic sleep function is enabled, the determination in Step S21-2 is YES, and the processing advances to Step S22-2.

On the other hand, in a case in which the automatic sleep function is not enabled, the determination in Step S21-2 is NO, and the processing advances to Step S26-2.

In Step S22-2, the function management unit 56 performs transition to a third sleep mode for suspending electricity other than the electricity necessary for enabling the BLE communication function (mode for further suspending the Wi-Fi communication function of the second sleep mode).

In Step S23-2, the function management unit 56 determines whether a startup request is received from the terminal device being connected via BLE.

In a case in which a startup request is received, the determination in Step S23-2 is YES, and the processing advances to Step S24-2.

On the other hand, in a case in which a startup request is not received, the determination in Step S23-2 is NO, and the processing returns to Step S23-2.

In Step S24-2, the function management unit 56 performs transition to the second sleep mode for suspending electricity other than the electricity necessary for enabling the Wi-Fi and BLE communication functions.

In Step S25-2, the communication control unit 54 controls the second communication unit to start up the Wi-Fi access point function.

In Step S26-2, the communication control unit 54 determines whether Wi-Fi connection with the terminal device being connected via BLE is established.

In a case in which Wi-Fi connection is established, the determination in Step S26-2 is YES, and the processing advances to Step S27-2. On the other hand, in a case in which Wi-Fi connection is not established, the determination in Step S26-2 is NO, and the processing enters a standby state.

In Step S27-2, the communication control unit 54 controls the second communication unit 21 to start transmitting the images targeted for automatic transmission via Wi-Fi communication. Subsequently, the processing advances to Step S29 of FIG. 4.

Namely, the following aspects can be considered in the image transmission processing.

(1) [Case in which operations are mainly performed with the camera, while the camera transitions to the sleep mode]

Pair the camera with the smartphone via BLE;

Store the Wi-Fi access point information of the camera into the smartphone;

Photograph images;

Allow the camera to transition to the sleep mode,

Start up the Wi-Fi access point function of the camera;

Transmit an instruction via BLE for establishing Wi-Fi connection to the smartphone; and Upon establishing Wi-Fi connection with the smartphone (and cancelling the sleep mode), Transmit the images photographed with the camera to the smartphone via Wi-Fi.

(2) [Case in which operations are mainly performed with the camera, while the camera does not transition to the sleep mode; or operations are concurrently performed]

Pair the camera with the smartphone via BLE;

Store the Wi-Fi access point information of the camera into the smartphone;

Photograph images, (and while continuing photographing);

(In a case in which the camera satisfies the conditions for transitioning to the sleep mode), without transitioning to the sleep mode, Start up the Wi-Fi access point function of the camera;

Transmit an instruction via BLE for establishing Wi-Fi connection to the smartphone; and Upon establishing Wi-Fi connection with the smartphone, Transmit the images photographed with the camera to the smartphone via Wi-Fi.

(3) [Case in which operations are mainly performed with the camera, while the smartphone transitions to the sleep mode]

Pair the camera with the smartphone via BLE;
Store the Wi-Fi access point information of the camera into the smartphone;
Photograph images;
Start up the Wi-Fi access point function of the camera;
Transmit an instruction via BLE for establishing Wi-Fi connection to the smartphone; and
Upon establishing Wi-Fi connection with the smartphone,
Transmit the images photographed with the camera to the smartphone via Wi-Fi.

(4) [Case in which operations are mainly performed with the smartphone, while the camera transitions to the sleep mode]

Pair the camera with the smartphone via BLE;
Store the Wi-Fi access point information of the camera into the smartphone;
Photograph images;
Allow the camera to transition to the sleep mode;
Upon receiving a startup request via BLE from the smartphone,
Cancel the sleep mode;
Start up the Wi-Fi access point function of the camera; and
Transmit the images photographed with the camera to the smartphone via Wi-Fi.

For example, if two CPUs are provided, the image capture apparatus 1 can transmit image files concurrently with photographing the images; however, it is extremely difficult to achieve a design that can deal with every situation, and unpredictable problems are likely to occur. Further, performing such an operation concurrently with photographing, etc. is not significantly efficient.

Through such operations, the user only has to photograph images, and the camera (image capture apparatus 1) automatically transfers the images to the smartphone (mobile terminal 2), while effectively utilizing the time during which the user is not operating the camera.

Therefore, the photographed images can be automatically transferred from the camera (image capture apparatus 1) to the smartphone (mobile terminal 2); and the images can be efficiently transferred while effectively utilizing the idle-time of the camera (mobile terminal 2).

The image capture apparatus 1 as thus constituted is provided with the second communication unit 21, the function management unit 56, the photography control unit 53, and the communication control unit 54.

The second communication unit 21 automatically transmits the photographed images to an external device.

The function management unit 56 switches and controls a first functional mode for enabling a photography function, and a second functional mode for disabling the photography function and enabling a communication function in relation to image transmission.

In a case in which an image is photographed in the first functional mode, the photography control unit 53 records the photographed image as a transmission target image that is targeted for automatic transmission by way of the second communication unit 21.

Even if a transmission target image is recorded, the communication control unit 54 controls the second communication unit 21 not to start transmission to an external device during the first functional mode, and controls the second communication unit 21 to start transmission to the external device during the second functional mode.

As a result, the image capture apparatus 1 can reliably transmit images without adversely affecting any other operation.

In addition, the image capture apparatus 1 is further provided with the function management unit 56.

The function management unit 56 switches and controls a first power mode (normal mode: non-sleep mode) that is a power mode capable of disabling a photography function, and a second power mode (a second sleep mode) that is a power mode capable of enabling the photography function, and enabling a communication function in relation to image transmission.

Moreover, during the first power mode (normal mode: non-sleep mode), in a case in which a predetermined period of time has elapsed without any user operation, or in a case in which the user instructs transition to a low power consumption mode (second sleep mode), the function management unit 56 performs transition to the second power mode (second sleep mode).

During the first functional mode, in a case in which a predetermined period of time has elapsed without any user operation, or in a case in which the user instructs transition to the low power consumption mode (second sleep mode), the function management unit 56 performs transition to the second functional mode.

As a result, the image capture apparatus 1 can reliably transmit images without adversely affecting any other operation.

In a case in which a predetermined period of time has elapsed without any user operation, or in a case in which the user instructs transition to the low power consumption mode (second sleep mode), and further, in a case in which the automatic transmission is enabled, and an unsent image remains, the communication control unit 54 controls the second communication unit 21 to start transmission to an external device.

As a result, the image capture apparatus 1 can reliably transmit images without adversely affecting any other operation.

In a case in which a user operation is received in the second functional mode and the second power mode (second sleep mode), the function management unit 56 performs transition to the first power mode (normal mode: non-sleep mode) and the first functional mode.

As a result, the image capture apparatus 1 can resume from the second power mode (second sleep mode) by way of a user operation.

In a case in which the second functional mode, during which the second communication unit 21 is transmitting a transmission target image to an external device, transitions to the first functional mode, the communication control unit 54 controls the second communication unit 21 to suspend the transmission to the external device, even if an unsent transmission target image remains.

As a result, the image capture apparatus 1 suspends transmission upon transitioning to the first functional mode while transmitting images; therefore, a transmission operation and another operation will not be performed at the same time, allowing images to be reliably transmitted without adversely affecting any other operation.

The function management unit 56 further switches and controls a third power mode (first sleep mode) for disabling both of the photography function and the communication function in relation to image transmission, in addition to the first power mode (normal mode: non-sleep mode) and the second power mode (second sleep mode); and in a case in which a predetermined period of time has elapsed without any user operation, or in a case in which a user instructs transition to the second power mode (second sleep mode), the function management unit 56 performs transition to the second power mode (second sleep mode) in the case where the second communication unit 21 starts transmission for an external device, and performs transition to the third power mode (first sleep mode) in the case where the second communication unit 21 does not start transmission for an external device.

As a result, the image capture apparatus 1 can reliably transmit images without adversely affecting any other operation.

In addition, the image capture apparatus 1 is further provided with the first communication unit 20.

The first communication unit 20 communicates via the first communication scheme that allows for predetermined communication other than image transmission in the third power mode (first sleep mode).

The second communication unit 21 communicates via the second communication scheme that allows for image transmission in the second power mode (second sleep mode).

In a case in which the image capture apparatus 1 has transitioned to the third power mode (first sleep mode), the image capture apparatus 1 is started up by way of communication from an external device via the first communication unit 20.

As a result, the image capture apparatus 1 can reliably transmit images without adversely affecting any other operation.

The first communication unit 20 maintains communication connection with an external device, even if the image capture apparatus 1 and the external device are not in a predetermined operational mode for allowing the second communication unit 21 to execute image transmission processing.

The second communication unit 21 maintains communication connection with an external device on condition of being in a predetermined operation mode.

The communication control unit 54 causes the second communication unit 21 to execute image transmission processing with an external device; and in a case in which the second communication unit 21 cannot execute image transmission processing due to the mode being the third power mode (first sleep mode) and not being a predetermined operational mode, the first communication unit 20 performs predetermined communication with the external device, thereby causing the image capture apparatus 1 and the external device to transition to a predetermined operation mode; and subsequently, the second communication unit 21 executes image transmission processing.

As a result, the image capture apparatus 1 can reliably transmit images without adversely affecting any other operation.

Further, with the image capture apparatus 1, the communication via the first communication scheme by way of the first communication unit 20 is lower in speed and consumes less power than the communication via the second communication scheme by way of the second communication unit 21.

The first communication unit 20 maintains communication connection with an external device, even if the second communication unit 21 cannot execute image transmission processing due to communication connection not being established between the second communication unit 21 and the external device.

The communication control unit 54 causes the first communication unit 20 to perform predetermined communication with the external device, thereby transitioning from a state where communication connection is not established to a state where communication connection is established between the second communication unit 21 and the external device.

As a result, the image capture apparatus 1 can reliably transmit images without adversely affecting any other operation.

It should be noted that the present invention is not to be limited to the aforementioned embodiments, and that modifications, improvements, etc. within a scope that can achieve the objects of the present invention are also included in the present invention.

The aforementioned embodiment is configured to transmit images in the sleep mode, during which the user does not operate, and the other functions are reliably disabled; however, as long as interference between the image transmission function and the other functions can be avoided, images may be transmitted during a period, for example, before transitioning to the sleep mode, in which the other functions are unlikely to be used. Moreover, the image transmission function may be enabled, before or after enabling another function while not being used by the user, such that an impression of delayed processing or the like may not be given to the user. Further, in the case of having a plurality of continuous operations in sequence, the image transmission function may be enabled between such operations.

In the aforementioned embodiments, explanations are provided with the example of the image capture apparatus 1 to which the present invention is applied being a digital camera; however, the present invention is not limited thereto in particular.

For example, the present invention can be applied to any electronic device in general having image sending processing function. More specifically, for example, the present invention can be applied to a laptop personal computer, a printer, a television receiver, a video camera, a portable navigation device, a cell phone device, a smartphone, a portable gaming device, and the like.

The processing sequence described above can be executed by hardware, and can also be executed by software.

In other words, the hardware configurations of FIG. 3 are merely illustrative examples, and the present invention is not particularly limited thereto. For example, the types of functional blocks employed to realize the above-described functions are not particularly limited to the examples shown in FIG. 3, so long as the image capture apparatus 1 can be provided with the functions enabling the aforementioned processing sequence to be executed in its entirety.

A single functional block may be configured by a single piece of hardware, a single installation of software, or a combination thereof.

In a case in which the processing sequence is executed by software, the program configuring the software is installed from a network or a storage medium into a computer or the like.

The computer may be a computer embedded in dedicated hardware. Alternatively, the computer may be a computer capable of executing various functions by installing various programs, e.g., a general-purpose personal computer.

The storage medium containing such a program not only can be constituted by the removable medium 31 shown in FIG. 2 which is distributed separately from the device main body in order to supply the program to a user, but also can be constituted by a storage medium or the like supplied to the user in a state incorporated in the device main body in advance. The removable medium 31 is composed of, for example, a magnetic disk (including a floppy disk), an optical disk, a magnetic optical disk, or the like. The optical disk is composed of, for example, a CD-ROM (Compact Disk-Read Only Memory), a DVD (Digital Versatile Disk), Blu-ray (Registered Trademark) or the like. The magnetic optical disk is composed of an MD (Mini-Disk) or the like. The storage medium supplied to the user in a state incorporated in the device main body in advance is constituted by, for example, ROM of FIG. 2 in which the program is recorded or a hard disk, etc. included in the storage unit 19 of FIG. 2.

It should be noted that, in the present specification, the steps defining the program recorded in the storage medium include not only the processing executed in a time series following this order, but also processing executed in parallel or individually, which is not necessarily executed in a time series.

In addition, in the present specification, a term system shall mean a general device configured from a plurality of devices, a plurality of means, and the like.

What is claimed is:

1. An image capture apparatus provided with a communication function, the image capture apparatus comprising:
an image capture unit including an image sensor;
a communication unit including a communication circuit; and
a control unit including a processor;
wherein the control unit is configured to:
set one of an automatic transmission mode and a non-automatic transmission mode;
judge whether the automatic transmission mode is set;
perform automatic transmission for automatically transmitting an image photographed with the image capture unit to an external device through the communication unit;
switch and control a first functional mode for enabling a photography function, and a second functional mode for disabling the photography function and enabling a communication function in relation to image transmission;
in a case in which an image is photographed in the first functional mode and it is judged that the automatic transmission mode is set, record the photographed image as a transmission target image that is targeted for the automatic transmission;
even if the transmission target image is recorded, control the communication unit not to start automatic transmission of the transmission target image to the external device during the first functional mode, and control the communication unit to start automatic transmission of the transmission target image to the external device during the second functional mode;
switch and control a first power mode that is a power mode capable of enabling the photography function, and a second power mode that is a power mode capable of disabling the photography function, and enabling the communication function in relation to image transmission;
perform transition to the second power mode, in a case in which a predetermined period of time has elapsed without any user operation, or in a case in which a user instructs transition to a low power consumption mode, during the first power mode; and
perform transition to the second functional mode, in a case in which the predetermined period of time has elapsed without any user operation, or in a case in which the user instructs transition to the low power consumption mode, during the first functional mode;
switch and control a third power mode that is a power mode for disabling both of the photography function and the communication function in relation to image transmission, in addition to the first power mode and the second power mode;
in a case in which the predetermined period of time has elapsed without any user operation, or in a case in which the user instructs transition to the low power consumption mode, perform transition to the second power mode when the communication unit starts automatic transmission of the transmission target image to the external device, and perform transition to the third power mode when the communication unit does not start automatic transmission of the transmission target image to the external device;
wherein the communication unit is configured to be able to:
communicate via a first communication system that allows for predetermined communication other than image transmission in the third power mode; and
communicate via a second communication system that allows for image transmission in the second power mode;
wherein, after transitioning to the third power mode, the communication unit is started up by way of communication from the external device via the first communication system;
wherein the control unit is further configured to:
cause the communication unit to execute image transmission processing with the external device via the second communication system; and
in a case in which the communication unit cannot execute image transmission processing due to being in the third power mode and not being in a predetermined operation mode for allowing the communication unit to execute image transmission processing, cause the communication unit to perform predetermined communication with the external device via the first communication system, thereby causing the image capture apparatus and the external device to transition to the predetermined operation mode, and subsequently, cause the communication unit to execute image transmission processing.

2. The image capture apparatus according to claim 1, wherein the control unit is further configured to:
control the communication unit to start automatic transmission of the transmission target image to the external device, in a case in which the predetermined period of time has elapsed without any user operation, or in a case in which the user instructs transition to the low power consumption mode, and further, in a case in which automatic transmission is enabled, and an unsent image remains.

3. The image capture apparatus according to claim 2, wherein the control unit is further configured to:
control the communication unit to suspend the automatic transmission to the external device, even if an unsent transmission target image remains, in a case in which the second functional mode transitions to the first functional mode, while the communication unit is transmitting the transmission target image to the external device.

4. The image capture apparatus according to claim 1, wherein the control unit is further configured to:
perform transition to the first power mode and the first functional mode, in a case in which a user operation is received in the second functional mode and the second power mode.

5. The image capture apparatus according to claim 1, wherein:
communication via the first communication system is lower in speed and consumes less power than communication via the second communication system;
the first communication system maintains communication connection with the external device, even if the communication unit cannot execute image transmission processing due to communication connection not being established with the external device via the second communication system; and
the control unit is further configured to perform predetermined communication with the external device via the first communication system, thereby transitioning from a state in which communication connection is not established, to a state in which communication connection is established, with the external device via the second communication system.

6. The image capture apparatus according to claim 1, wherein the control unit is further configured to:
communicate with the external device by the first communication system or the second communication system, wherein the first communication system maintains communication connection even if the image capture apparatus and the external device are not in the predetermined operation mode for allowing the communication unit to execute image transmission processing, and wherein the second communication system maintains communication connection with the external device on condition of being in the predetermined operation mode for allowing the communication unit to execute image transmission processing; and
perform automatic transmission for automatically transmitting the image photographed with the image capture unit to the external device through the communication unit by the second commutation system.

7. A communication control method executed by way of an image capture apparatus provided with a communication function and comprising an image capture unit including an image sensor, a communication unit including a communication circuit, and a control unit including a processor, the communication control method comprising, under control of the control unit:
setting one of an automatic transmission mode and a non-automatic transmission mode;
judging whether the automatic transmission mode is set;
performing automatic transmission for automatically transmitting an image photographed with the image capture unit to an external device through the communication unit;
switching and controlling a first functional mode for enabling a photography function, and a second functional mode for disabling the photography function and enabling a communication function in relation to image transmission;
in a case in which an image is photographed in the first functional mode and it is judged that the automatic transmission mode is set, recording the photographed image as a transmission target image that is targeted for the automatic transmission;
even if the transmission target image is recorded, controlling the communication unit not to start automatic transmission of the transmission target image to the external device during the first functional mode, and controlling the communication unit to start automatic transmission of the transmission target image to the external device during the second functional mode;
switching and controlling a first power mode that is a power mode capable of enabling the photography function, and a second power mode that is a power mode capable of disabling the photography function, and enabling the communication function in relation to image transmission;
performing transition to the second power mode, in a case in which a predetermined period of time has elapsed without any user operation, or in a case in which a user instructs transition to a low power consumption mode, during the first power mode;
performing transition to the second functional mode, in a case in which the predetermined period of time has elapsed without any user operation, or in a case in which the user instructs transition to the low power consumption mode, during the first functional mode;
switching and controlling a third power mode that is a power mode for disabling both of the photography function and the communication function in relation to image transmission, in addition to the first power mode and the second power mode; and
in a case in which the predetermined period of time has elapsed without any user operation, or in a case in which the user instructs transition to the low power consumption mode, performing transition to the second power mode when the communication unit starts automatic transmission of the transmission target image to the external device, and performing transition to the third power mode when the communication unit does not start automatic transmission of the transmission target image to the external device;
wherein the communication unit is configured to be able to:
communicate via a first communication system that allows for predetermined communication other than image transmission in the third power mode; and
communicate via a second communication system that allows for image transmission in the second power mode;
wherein, after transitioning to the third power mode, the communication unit is started up by way of communication from the external device via the first communication system;
wherein the method further comprises, under control of the control unit:
causing the communication unit to execute image transmission processing with the external device via the second communication system; and
in a case in which the communication unit cannot execute image transmission processing due to being in the third power mode and not being in a predetermined operation mode for allowing the communication unit to execute image transmission processing, causing the communication unit to perform predetermined communication with the external device via the first communication system, thereby causing the image capture apparatus and the external device to transition to the predetermined operation mode, and subsequently, causing the communication unit to execute image transmission processing.

8. A non-transitory recording medium having a program recorded thereon for causing a computer for controlling an image capture apparatus, provided with a communication function and comprising an image capture unit including an image sensor, and a communication unit including a communication circuit, to execute functions comprising:

setting one of an automatic transmission mode and a non-automatic transmission mode;

judging whether the automatic transmission mode is set;

performing automatic transmission for automatically transmitting an image photographed with the image capture unit to an external device through the communication unit;

switching and controlling a first functional mode for enabling a photography function, and a second functional mode for disabling the photography function and enabling a communication function in relation to image transmission;

in a case in which an image is photographed in the first functional mode and it is judged that the automatic transmission mode is set, recording the photographed image as a transmission target image that is targeted for the automatic transmission;

even if the transmission target image is recorded, controlling the communication unit not to start automatic transmission of the transmission target image to the external device during the first functional mode, and controlling the communication unit to start automatic transmission of the transmission target image to the external device during the second functional mode;

switching and controlling a first power mode that is a power mode capable of enabling the photography function, and a second power mode that is a power mode capable of disabling the photography function, and enabling the communication function in relation to image transmission;

performing transition to the second power mode, in a case in which a predetermined period of time has elapsed without any user operation, or in a case in which a user instructs transition to a low power consumption mode, during the first power mode;

performing transition to the second functional mode, in a case in which the predetermined period of time has elapsed without any user operation, or in a case in which the user instructs transition to the low power consumption mode, during the first functional mode;

switching and controlling a third power mode that is a power mode for disabling both of the photography function and the communication function in relation to image transmission, in addition to the first power mode and the second power mode; and in a case in which the predetermined period of time has elapsed without any user operation, or in a case in which the user instructs transition to the low power consumption mode, performing transition to the second power mode when the communication unit starts automatic transmission of the transmission target image to the external device, and performing transition to the third power mode when the communication unit does not start automatic transmission of the transmission target image to the external device;

wherein the communication unit is configured to be able to:

communicate via a first communication system that allows for predetermined communication other than image transmission in the third power mode; and communicate via a second communication system that allows for image transmission in the second power mode;

wherein, after transitioning to the third power mode, the communication unit is started up by way of communication from the external device via the first communication system;

wherein the program causes the computer to execute further functions comprising:

causing the communication unit to execute image transmission processing with the external device via the second communication system; and in a case in which the communication unit cannot execute image transmission processing due to being in the third power mode and not being in a predetermined operation mode for allowing the communication unit to execute image transmission processing, causing the communication unit to perform predetermined communication with the external device via the first communication system, thereby causing the image capture apparatus and the external device to transition to the predetermined operation mode, and subsequently, causing the communication unit to execute image transmission processing.

* * * * *